United States Patent [19]

Kinser

[11] Patent Number: 5,066,071
[45] Date of Patent: Nov. 19, 1991

[54] DEVICE FOR DETECTING METALLIC PARTICLES IN LUBRICANT

[76] Inventor: Robert W. Kinser, 1069 W. 27th St., Ogden, Utah 84401

[21] Appl. No.: 572,234

[22] Filed: Aug. 24, 1990

[51] Int. Cl.⁵ .............................................. B60B 7/00
[52] U.S. Cl. ........................ 301/108 TW; 301/108 R; 210/222
[58] Field of Search ............ 301/37 R, 108 R, 108 A, 301/108 S, 108 SC, 108 TW, 37 N; 184/6.25, 1.5; 210/222, 223

[56] References Cited

U.S. PATENT DOCUMENTS

| | | | |
|---|---|---|---|
| 1,326,967 | 1/1920 | Richard | 301/108 TW |
| 2,914,178 | 11/1959 | Edelen | 210/222 |
| 3,089,338 | 5/1963 | Glasgow | 301/108 TW |
| 4,834,464 | 5/1989 | Freshe | 301/108 TW X |
| 4,935,133 | 6/1990 | Hirawa | 210/222 |

Primary Examiner—Russell D. Stormer
Attorney, Agent, or Firm—Stevens, Davis, Miller & Mosher

[57] ABSTRACT

A device for visibly detecting the presence of metallic particles in the oil of the hub of a motor vehicle such as a truck. The hub has a transparent portion and an access hole with a plug therein. In this invention the plug carries a flat strip or flag of magnetic material pivotally suspended from the axial inner end of the plug. As the hub and the plug rotate the magnetic strip can remain relatively stationary to collect any metallic particles in the oil. The strip is preferably light colored to show the metallic particles and is readily viewable through the transparent portion of the hub.

12 Claims, 1 Drawing Sheet

DEVICE FOR DETECTING METALLIC PARTICLES IN LUBRICANT

FIELD OF THE INVENTION

This invention relates to means for detecting the presence of metallic particles in the lubricating fluids of automotive bearings and particularly the wheel bearings of large vehicles such as trucks.

More particularly this invention relates to a magnetic flag for attracting magnetic particles in the lubricating fluid, that magnetic flag being positioned so that it is viewable through a transparent lens on the hub of a truck wheel axle.

BACKGROUND OF THE INVENTION

A truck wheel bearing hub encloses a chamber that is partially filled with oil so that at least the bottom portion of the wheel bearing is immersed in oil when the truck is stationary. The wheel bearing is lubricated when oil is splashed due to the rotation of the wheel when the truck is moving. An access hole is provided in the center of the axial outer portion of the hub cap assembly and the oil level is usually just below the bottom of that access hole when the truck is stationary. The access hole has a plug, usually a deformable plug, usually having a vent hole therethrough, which can be readily removed. Although the plug is usually made of opaque material, the axial end wall of the hub, or at least a portion thereof, is made of a transparent material so that the truck operator, when checking the wheels at an inspection stop, can view the oil level. It is of course a sign of impending trouble if there are metallic particles in the oil of the truck hub.

OBJECTS OF THE INVENTION

It is an object of the present invention to enable a truck operator to readily ascertain visually whether or not there are any metallic particles in the oil of a truck hub upon routine inspection thereof.

It is a further object of this invention to enable a truck operator to ascertain the presence of magnetic metallic particles in a wheel hub without the necessity of removing any parts.

It is a further object of this invention to provide a retrofitable access plug for the hub of a truck wheel which will collect any metallic particles in the lubricating oil of the bearings in a manner so that the presence of these particles can be readily seen through a transparent window of the wheel hub.

It is a further object of this invention to provide a plug which will attract magnetic metallic particles that will remain attached to a magnetic collector until they are physically removed by the operator.

Other objects and advantages will become apparent from the following disclosure which is given by way of example only and not of limitation.

DISCUSSION OF THE PRIOR ART

Devices for removing magnetizable particles from various lubricating systems are well known in the art, for example drain plugs for internal combustion engines having a magnetized portion projecting into the oil pan. There is also a known example of a plug for a wheel bearing hub assembly having a magnetic rod; this is shown in U.S. Pat. No. 4,834,464 to Frehse where the magnetic rod serves to collect magnetizable particles within the wheel hub. However, that magnetic rod is not viewable from outside of the wheel hub and does not have a surface where such particles could be readily seen.

U.S. Pat. No. 3,316,022 to Isenbarger discloses a hub cap assembly for a wheel housing having a transparent window for viewing the oil level in the hub and a plastic deformable plug in the center of that window. There is no disclosure of any magnetic means for attracting particles in that oil.

U.S. Pat. No. 3,089,338 to Glasgow is similar, showing a plurality of windows through which the oil level can be viewed.

It also lacks a magnet for attracting metal particles from the oil. U.S. Pat. No. 408,155 to Wilson is similar in showing a transparent window.

U.S. Pat. No. 4,893,877 to Powell et al discloses an auxiliary self generated lighted hub cap for attachment to the outside of a wheel hub so as to illuminate the center of that hub. A permanent magnet assembly is pivotally secured to the cap body and weighted so the permanent magnet is in a generally fixed orientation with respect to the hub. Thus as the hub rotates there is relative motion between the hub and the magnet, thus generating sufficient electricity to light LEDs on the auxiliary hub cap.

BRIEF DESCRIPTION OF THE INVENTION

This invention in its most basic form is a retrofitable plug for the access port of a truck wheel bearing hub cap assembly. The plug has a central axially inwardly extending portion that acts as a point of rotation for a magnetic flag pivotably mounted thereon. That magnetic flag is readily a visible through a transparent window on the hub, especially when the magnetic flag is painted a light color.

DETAILED DESCRIPTION OF THE INVENTION

In the figures like numbers refer to like objects.

Figure 2:
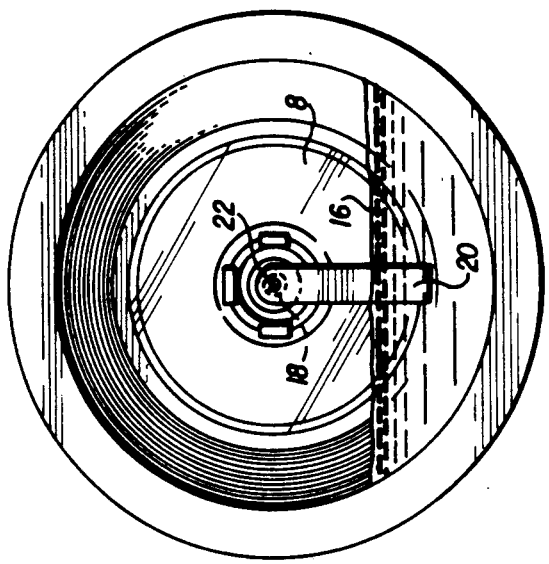
FIG. 2 is an elevational view looking into the hub of FIG. 1 from the outside.
Figure 3:
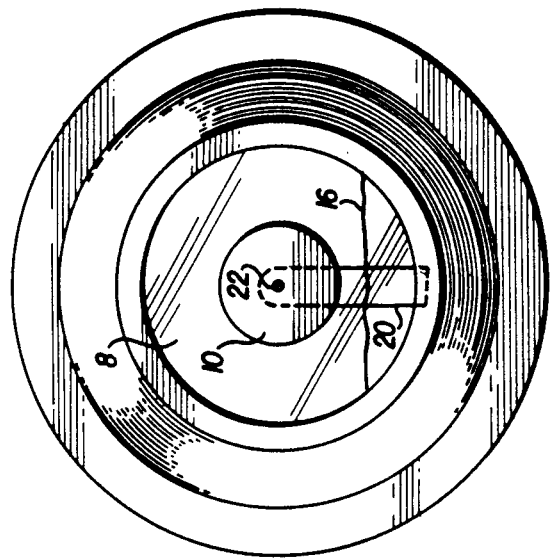
FIG. 3 is a similar view looking at the flag from the inside.
Figure 1:
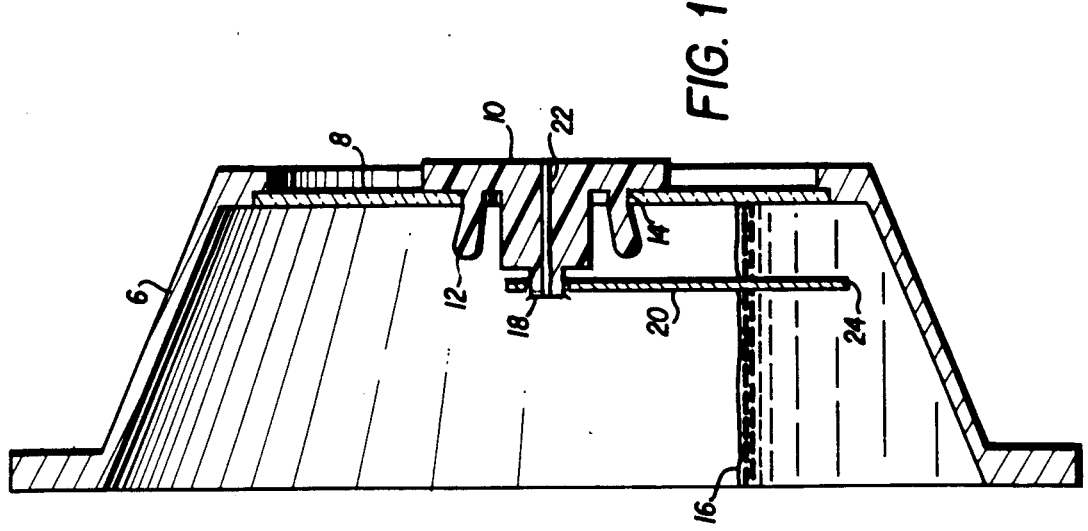
FIG. 1 is an elevational sectional view taken along the axis of a truck wheel bearing hub cap assembly.

FIG. 1 shows a truck wheel bearing hub cap assembly 6 having a transparent annular window 8 with a plastic deformable plug 10 that is sealably fitable into an aperture 14 of the window and is held therein by flexible radially outwardly extending ears 12 which may be bent inwardly in order to remove plug 10 from aperture 14. Inside the hub there is a quantity of oil 16 usually filling about one-quarter of the hub space and being up to a level where the top of the oil is normally viewable through window 8. The plug 10 has an axially inwardly extended portion 18 which acts as a pivot point for a magnetic flag 20 having its distal end 24 immersed in oil 16 when the vehicle is at rest. When the vehicle is moving the oil is splashing around inside the hub so as to pass continually over both the inner and outer surfaces of magnetic flag 20.

In an actual embodiment the plug 10 is made of a flexible injection moldable plastics material sold by the Monsanto Chemical Company under the name Santoprene which is resistant to reaction by the oil 16. The central axially extending portion 18 of the plug is about 0.375 inches in diameter and the pivot hole in the magnetic flag 20 which passes over portion 18 is about 0.390 inches in diameter thus leaving a clearance of about 0.015 inches to allow free pivotally rotation. The distal end of portion 18 is slightly flared so as to secure the magnetic flag in place but preferably may be deformable to permit its replacement of the flag if necessary. The outer diameter of the plug 10 is usually between ¾ and 1⅛ inches, depending upon the size of the aperture 14 in the window 8. The plug 10 preferably has a vent hole 22 passing therethrough so as to equalize the pressure between the inside and outside of the hub thus preventing a pressure build-up inside the hub. The vent hole 22 is sufficiently small to minimize any oil passing therethrough.

The magnetic flag 20 is made of a planar plastics material sold by 3M of a type similar to that used to hold magnetic signs on metal surfaces and is composed of nitrile blended with iron oxide The material comes in various thicknesses, the applicant prefers to use a thickness of about 0.060 inches that is flexible but still has strong magnetic properties. The iron oxide particles in the nitrile are asymmetrical so that they can be oriented along flux line by passing the material over a magnetic roller.

The magnetic flag 20 is ⅝ to ¾ inches wide and ¼ to 2 inches long, has two planar surfaces and is pivotally suspended from portion 18 so that it will consistently hang down vertically in the "six o'clock" position with its distal end 24 suspended in the oil. The axially outer flat surface of the flag 20 is painted a light color such as yellow or white so that when metallic particles are magnetically attracted to that surface, there is a good contrast and they will be readily visible on the light colored background when viewed through the window 8. The flat outer surface is generally parallel to the plane of the window 8.

Because the magnetic flag is small and of quite light weight and is pivotally suspended from portion 18 and in a well lubricated surrounding, it has little or no tendency to rotate along with plug 10. Since flag 20 is not rotating, it has no centrifugal force which should tend to fling off magnetic particles that might otherwise stay in place on its surface. Thus, when the hub assembly is rotating at high speed, the magnetic flag 20 still remains vertically stationary and positioned to attract magnetizable particles passing over its surface.

The plug 10 is readily removable from the aperture 14 so that it can be closely visually inspected if any particles are noted through window 8. The truck operator can then make a note of the presence of such particles, wipe off the surface of the flag 20 and reinsert it to see if further particles are attracted. If there is a consistent pattern of deposits of new particles, it serves as a warning to the vehicle operator that trouble is developing in the wheel bearings and that prompt preventive maintenance is in order.

Since the magnetic flag 20 is made of relatively thin, flat flexible material, it can be bent when the plug 10 is removed from the aperture 14 if necessary. The plug with its flag pivotally secured in place can be sold as a separate retrofitable item to be installed in existing truck hub cap assemblies. Transparent hub cap end panels are now in very common usage so that the visible magnetic flag, once in place, can be readily viewed.

As an alternative to the above construction, the magnetic flag could be weighted so that it would assume a position other than the "six o'clock" position shown in the accompanying drawings.

It is also contemplated that the presence device could be built with a magnetic flag that rotates with the plug 10 but was provided with a stronger magnetic surface so as to hold particles thereon even when subjected to centrifugal force. An important aspect of the present invention is to have a magnetic flag with a preferably flat preferably light colored surface which is positioned close to a transparent window 8 so that it may be readily viewed therethrough. If the flag were arranged to pivot with the plug 10 rather than remaining stationary, then the flag could be rotated to a position on the window for easier viewing, either by rotating the entire plug 10 or a central portion thereof to which the magnetic flag would be attached.

It is preferred that the magnetic flag be made of a material having particular and well defined flux lines therein so that the presence of magnetic particles can readily be recognized because they will adhere along those flux lines. However, a magnetic flag material that would attract particles over the entire surface thereof is also contemplated.

I claim:

1. A device for visually detecting the presence of magnetic particles in the lubricating fluid of a vehicle hub, said hub having a transparent portion at the axial end thereof for viewing the lubricating fluid from outside the hub, said hub having an access opening in the axial end thereof, said device comprising
   a plug body means of elastic deformable plastics material sealably fitable into said access opening;
   an elongated member of magnetic material within said vehicle hub positioned to be exposed to said lubricating fluid and pivot means on the axially inner portion of said plug body means for pivotally mounting said elongated magnetic member so that as the hub rotates the elongated magnetic member is free to remain stationary in relation to the rotation of the hub and positioned so as to be viewable through said transparent portion, said magnetic member comprising a strip of plastics material having magnetizable particles therein and having an aperture near one end, said pivot means extending through said aperture for pivotally mounting said elongated magnetic member.

2. The device of claim 1 wherein the surface of the magnetic member that is viewable has a light color so as to facilitate observation of metallic particles attracted thereto.

3. The device of claim 1 in which the magnetizable particles of the elongated member are oriented along flux lines so that metallic particles attracted to the member will lie along said flux lines.

4. The device of claim 1 wherein said plug body means has a vent opening extending axially therethrough with the axially inner end of the opening being within said pivot portion.

5. A device for visibly detecting the presence of magnetic particles in the lubricating fluid of a vehicle hub comprising
   a plug body means of elastic deformable plastics material which is sealably fitable into an aperture in the axial end of said vehicle hub;
   said plug body means having a portion which extends axially inwardly of the body when the body is positioned in said aperture;

an elongated member of magnetic material pivotally attached to said axially inwardly extending portion so as to be exposed to lubricating fluid inside said hub, said elongated member comprising a flat strip of plastics material having magnetizable particles therein and an aperture near one end for pivotally mounting said elongated member so that it is free to stay in a generally vertical position when said plug body and said hub are rotating.

6. The device of claim 5 wherein the surface of the magnetic member that is viewable has a light color so as to facilitate observation of metallic particles attracted thereto.

7. The device of claim 5 in which the magnetizable particle are oriented along flux lines so that metallic particle attracted to the member will lie along said flux lines.

8. The device of claim 5 wherein said plug body means has a vent opening extending axially therethrough with the axially inner end of the opening being within said pivot portion.

9. A device for visibly detecting the presence of magnetic particles in the lubricating fluid of a vehicle hub, wherein said hub has a transparent portion at the axial end thereof for viewing the lubricating fluid from outside the hub, said device comprising a plug body means of elastic deformable plastics material sealably fitable into an aperture in the axial end of said vehicle hub and having an axially inwardly extending pivot means portion;

a member of magnetic material carried by said plug body means on the pivot means portion thereof so as to be positionable within the vehicle hub to be viewable from the outside of the hub through the transparent portion of the hub, said magnetic member being mounted to be positionable generally parallel with said transparent portion, said magnetic member comprising a strip of plastics material having magnetizable particles therein and having an aperture near one end, said pivot means portion extending through said aperture for pivotally mounting said member so that it is free to stay in a generally vertical position when said plug body and said hub are rotating.

10. The device of claim 9 wherein the surface of the magnetic member that is viewable is generally planar and has a light color so as to facilitate observation of metallic particles attracted thereto.

11. The device of claim 9 in which the magnetizable particle are oriented along flux lines so that metallic particle attracted to the member will lie along said flux lines.

12. The device of claim 9 wherein said plug body means has a vent opening extending axially therethrough with the axially inner end of the opening being within said pivot portion.

* * * * *